Aug. 24, 1954
R. S. PASSMORE
2,687,040
DEVICE FOR USE IN TESTING MILKING
MACHINE TEAT CUP INFLATIONS
Filed Aug. 21, 1951
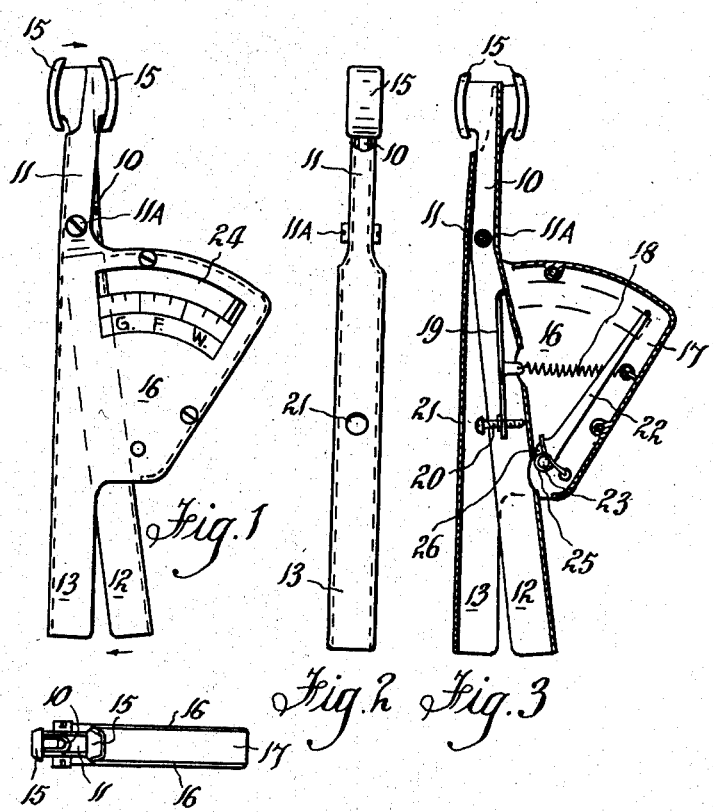
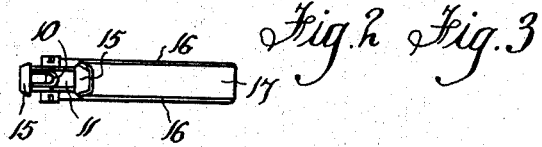
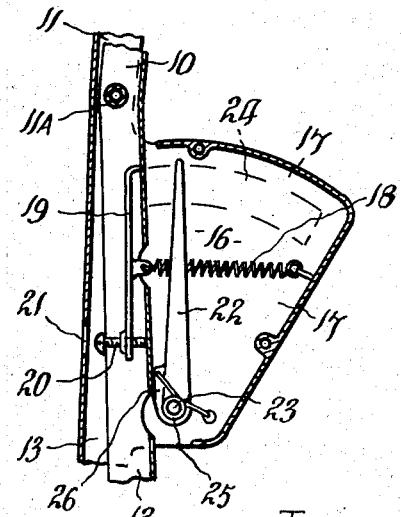
Inventor
Robert Sydney Passmore
By Young, Emery & Thompson
Attys.

Patented Aug. 24, 1954

2,687,040

UNITED STATES PATENT OFFICE 2,687,040

DEVICE FOR USE IN TESTING MILKING MACHINE TEAT CUP INFLATIONS

Robert Sydney Passmore, New Plymouth, Taranaki, New Zealand

Application August 21, 1951, Serial No. 242,807

3 Claims. (Cl. 73—88)

This invention relates to a construction of device designed for use in testing the quality of the inflations of milking machine teat cups in which each cup is formed by a rigid cylindrical casing and a rubber sleeve, or inflation disposed to extend through the casing length and secured at its two ends to the respective ends of the casing in a hermetically sealed manner. The sleeve or inflation surrounds a teat of the cow in the placement of the milking installation upon a cow and in the operation of milking is caused to subject the teat to a continuous sequence of alternate squeezes and releases by or through the operation of means whereby air is alternately admitted to, and withdrawn from, the space surrounding the inflation, while a continuous vacuum suction is maintained in the space inside the inflation. This manner of operation, and the purposes and effects thereof, are well known in the art and need no fuller description in this specification to enable the present invention to be understood.

It is required, however, that for the most efficient milking, an inflation should be in a condition such that its quick and positive response to the release periods of its operations must be assured. Owing to the continual flexing of the rubber inflation to which it is subjected, a deterioration in the quality of its said responsiveness takes place from time to time and requires that the inflation should be replaced by a new one, or should be re-tensioned by the means generally embodied in a teat cup's construction for that purpose.

Consequently, in order to maintain the efficiency of a milking machine installation, it becomes necessary to periodically test the quality and general resilient characteristics of the teat cup inflations. The present invention consists in a simple, cheap and readily operable device adapted to be inserted into the end of an inflation, whether the inflation is loose, or is assembled with the cup, and to give an indication of the strength or resilient quality of the inflation as between strong and weak.

The said device, in its general features, comprises a pair of arms pivoted together to allow of their extremities engaging each other or being moved apart, and having handle extensions to provide for this movement. The arms are spring controlled to cause their ends to be normally moved apart a defined distance. These ends are provided on their respective outer sides with pads facing outward from each other and so made that when the arms are closed together, against the spring action, the ends may be passed into the end of an inflation. When the arms are thus inserted and released from the closing action of their handles they will move apart under the spring action to expand within the inflation and will thus move to an extent permissible by the strength or resiliency of the inflation as compared with the strength of the spring. Combining with these arms are indicator means embodying a pivoted indicator hand moving over a scale marking and itself spring controlled and combined with the handles of the device to cause it to move reversely across the scale as the arms are closed together and move apart respectively.

The construction of the device in an appropriate and suitable manner is illustrated in the accompanying drawings and will be hereinafter fully explained in relation thereto.

Figure 1 is a side elevation and

Figure 2 is an outer edge elevation of the device.

Figure 3 is a sectional side elevation thereof showing the device in its normal open condition.

Figure 4 is a plan thereof.

Figure 5 is an enlarged sectional detail view of the actuating handles and indicator means in the closed condition of the arms.

In carrying out the invention according to the manner shown, the device is most suitably made of metal sheeting bent and cut into the required form. It comprises a pair of arms 10 and 11 pivoted together at 11A to provide for their extremities being brought together or moved apart and having handle extensions, 12 and 13 respectively, beyond the pivot for so controlling their movement, pincer or scissor fashion. These members are suitably made of channel cross section in shape and are assembled together by causing the channels of the two to face respectively inward towards each other and with the member 10 and 12 nesting in between the sides of the other member 11 and 13. In this manner, as shown clearly in Figures 1 and 3, the extent of the opening and closing movement of the arm ends is restricted within defined distances.

To the end of each arm 10—11 there is affixed a block or pad 15 which is arranged on the outside of the arm and shaped generally with a convex surface to adapt it for engaging the inside peripheral surface of an inflation into which the arm ends are passed.

The device embodies means whereby the movements of the member 10 and 12 in relation to the other member 11 and 13 may be transmitted to an indicator mechanism of any approved nature to cause a pivoted pointer arm to move over a scale in correspondence with such movements. The said means in their design and actuation cause the pointer arm to move from one end of the scale to the other in respectively opposite directions as the arms 10 and 11 move together and apart, in their movements through the defined distances. Such indicator may therefore be combined with a scale over which it moves from a position represented as "good" through an intermediate position represented as "fair" to one at the other extreme represented as "weak" as the arms 10 and 11 move apart from a closed position within the inflation and as permitted by the condition of the inflation. The said means also are controlled in their operation by means of a spring acting to normally move the arms apart which spring in its strength is countered by the resiliency of the inflation tending to hold the arms in a closed position as they are inserted into the inflation end.

The means for this purpose which are shown in the drawings and are suitable in effecting the said objects are fitted within a housing projecting out from the inside edges of the handle 13, beyond the handle 12, such housing being formed by a plate extension 16 from each edge of the said handle 13, shaped as shown, and a cover 17 fixed to extend across between the plates along the top and outer edges thereof. This housing is designed to contain the spring mechanism for controlling the aforesaid movements of the arms and handles, and the indicator means which are hereinafter referred to.

The said spring controlling mechanism is formed by the tension spring 18 which extends between the outer part of the cover 17 and the handle 12 to thereby act to draw the said handle 12 outward relating to the handle 13. However, to provide for the spring being regulated in its tension the end thereof connected to the handle 12 is attached to about midway in the length of a strip 19 arranged to extend loosely along within the channel of the handle, the upper end of which strip is hingedly attached to the said handle. Its lower end has a set screw 20 passing through it from the outside to engage with its end the bend of the channel, by the turning of which screw the distance of the strip from the channel bend may be varied and thus adjust the spring's tension. Provision is made for access to this screw for its adjustment purposes, by forming an aperture 21 in the bend of the handle 13 at a position opposite the screw head, through which aperture the blade of a screw driver may be passed.

The indicating means in this construction of the device comprise an indicator arm 22 which is fitted upon a pivot pin 23 positioned transversely across the lower part of the space enclosed between the housing plates 16 so that its pointer end extends upwards within the housing and is adapted to swing in an arc across the length thereof. One of the housing plates 16 is made with a vision slot 24 (see Figure 1) curving in an arc coincidently with the movements of the pointer end so that the positions assumed by the indicator arm may be seen. The said arm is controlled by means of a coiled spring 25 surrounding its arbor one end of which bears upon a tail piece 26 of the arm while its other end is secured to an adjacent point of the housing side 16. This spring is tensioned to cause it to turn the arm in a manner such that the tail piece is kept in engagement with the edge of the handle 12. This provides that when the handles are normally spread, the handle by engagement with the tail piece, forces the indicator arm to the outer extreme of its swinging movement as shown in Figure 3, and when the handles are brought together, the indicator arm will be free under its spring action to swing across to the other extreme of its movement as shown in Figure 5.

The aforesaid manner of attaching and of tensioning the tension spring 18 governing the movement apart of the handles and of its relationship with the coiled spring 25 of the pointer arm, ensures that the pointer arm, may be correctly aligned to its normal zero position upon the indicator scale when the handles are spread to their normal positions.

Other ways of spring controlling the arms 10—11 may be employed and of adjusting the positions assumed by the indicator pointer arm may be employed without departing from the spirit of this invention.

In the use of this device therefore the operator grasping its handles in the one hand will close them and the arms 10—11, thereby allowing the indicator arm 22 to swing across to the left as in Figure 5. With the arms thus closed their ends are inserted a distance down within the inflation to be tested and the grip on the handles released. The arms will then be free to move apart under the draw of the spring 18 and will do so if the condition (resiliency) of the inflation is such as to allow them. If the condition of the inflation is such as to prevent any movement apart the indicator arm will remain in the said position, but if the condition has deteriorated to any extent the arms will move apart in corresponding degrees thereby causing the indicator arm to move across less or more towards the position shown in Figure 5. By appropriately scaling one edge of the vision slot 24 as indicated in Figure 1, the condition of the inflation may be checked in accordance with the position of the indicator assumed thereby, that is from "Good" down through "Fair" to "Weak."

Having now described my invention what I claim is:

1. A device for use in testing milking machine teat cup inflations comprising a pair of arms pivotally connected together and each having a handle forming extensions beyond the pivot whereby the arms may be moved together and apart, a housing combined with one of the said handles to project transversely from its inner edge and surrounds a part of the other handle in spaced relation, one of the sides of the housing being formed with a slot opening, a tension spring positioned within the said housing and connected to the said other handle and to the outer end of the housing and serving to draw the said other handle outwardly in the housing to normally cause the arm ends to be positioned a certain distance apart, an indicator pointer pivotally mounted by means of a pivot within the housing and having its free end passing behind the said slot opening, the pointer having a cam at the pivot end thereof and projecting from it so as to engage the outer edge of the said other handle within the said housing, and a spring connected to the pointer and the housing serving to normally force the said cam into contact with the said other handle, controlling the said pointer to cause it to be moved in reverse directions by and under control of the respective in and out movements of the said other handle within the housing.

2. A device for use in testing milking machine teat cup inflations according to claim 1, in which means are provided for the attachment of the said tension spring to the said other handle within the housing and comprising a strip of material arranged to extend down along the inner edge of the said other handle and hingedly attached thereto at one end thereof, and a set screw mounted in the other end of the strip and engaging the said other handle, the tension spring being connected to the strip at a point between the ends thereof.

3. A device for use in testing milking machine teat cup inflations according to claim 1, in which the said last-mentioned spring surrounds the pointer pivot and the ends of which are secured respectively to the housing and to the pointer.

References Cited in the file of this patent

UNITED STATES PATENTS

| Number | Name | Date |
|---|---|---|
| 1,740,695 | Johansson | Dec. 24, 1929 |
| 2,406,386 | Koepnick et al. | Aug. 27, 1946 |
| 2,494,571 | Milburn | Jan. 17, 1950 |
| 2,573,075 | Watson | Oct. 30, 1951 |